US012777039B2

(12) United States Patent
Browne et al.

(10) Patent No.: US 12,777,039 B2
(45) Date of Patent: Oct. 27, 2026

(54) SYSTEM AND METHOD OF PREAUTHORIZING CONTENT

(71) Applicant: COMCAST CABLE COMMUNICATIONS MANAGEMENT, LLC, Philadelphia, PA (US)

(72) Inventors: David Browne, Seattle, WA (US); Wayne Fuller, Seattle, WA (US); Jonathan Colwell, Seattle, WA (US)

(73) Assignee: COMCAST CABLE COMMUNICATIONS MANAGEMENT, LLC, Philadelphia, PA (US)

(*) Notice: Subject to any disclaimer, the term of this patent is extended or adjusted under 35 U.S.C. 154(b) by 887 days.

(21) Appl. No.: 14/940,731

(22) Filed: Nov. 13, 2015

(65) Prior Publication Data

US 2017/0142110 A1 May 18, 2017

(51) Int. Cl.

*G06Q 20/40* (2012.01)
*G06Q 20/12* (2012.01)
*H04L 9/40* (2022.01)

(52) U.S. Cl.

CPC ......... *H04L 63/10* (2013.01); *G06Q 20/1235* (2013.01); *G06Q 20/40* (2013.01)

(58) Field of Classification Search

CPC ..... G06Q 20/1235; G06Q 20/40; H04L 63/10
USPC ...................................................... 705/59, 51
See application file for complete search history.

(56) References Cited

U.S. PATENT DOCUMENTS

| | | | | |
|---|---|---|---|---|
| 8,010,984 | B2 * | 8/2011 | Thukral | H04N 21/47202 725/86 |
| 8,972,187 | B1 * | 3/2015 | Steinmetz | H04L 9/3236 701/533 |
| 9,131,242 | B2 * | 9/2015 | MacInnis | H04N 19/433 |
| 9,516,105 | B1 * | 12/2016 | Roseman | H04N 21/4331 |
| 9,959,145 | B1 * | 5/2018 | Gershon | G07F 17/3255 |
| 2002/0091544 | A1 | 7/2002 | Middeljans et al. | |
| 2002/0161709 | A1 | 10/2002 | Floyd et al. | |
| 2003/0061605 | A1 | 3/2003 | Genevois et al. | |
| 2003/0092444 | A1 * | 5/2003 | Sengodan | H04W 12/08 455/437 |
| 2004/0143818 | A1 * | 7/2004 | Kijima | G11B 20/00855 717/122 |
| 2007/0124602 | A1 * | 5/2007 | Wald | G11B 20/00731 726/28 |
| 2008/0243694 | A1 * | 10/2008 | Johnson | G06Q 30/0603 705/52 |
| 2009/0006762 | A1 * | 1/2009 | Gara | G06F 12/0862 711/137 |

(Continued)

*Primary Examiner* — Zeshan Qayyum
(74) *Attorney, Agent, or Firm* — Ballard Spahr LLP

(57) ABSTRACT

A system and method for managing timely delivery of content is disclosed wherein, to prevent delays caused by pre-delivery processing, such as entitlement or payment processing, the system can initiate delivery of at least a portion of the content. In an aspect, an authorization system can receive a request for content. The authorization system can queue an authorization request and/or an entitlement check for processing in response to the request for content. The authorization system can pre-authorize the request and initiate delivery of at least the portion of content prior to processing the authorization request and/or the entitlement check.

20 Claims, 6 Drawing Sheets

(56) References Cited

U.S. PATENT DOCUMENTS

2009/0287764 A1* 11/2009 Pazhyannur ........ H04W 12/082 726/4
2012/0109908 A1* 5/2012 Barsness ................. G06F 16/21 707/693
2012/0324108 A1* 12/2012 Kohli ...................... H04L 69/16 709/226
2013/0160146 A1* 6/2013 Kaiser .............. H04N 21/63345 726/30
2013/0166943 A1* 6/2013 Song ....................... G06F 9/505 714/E11.073
2013/0297606 A1* 11/2013 Tola ...................... G06F 16/954 707/E17.089
2014/0052873 A1* 2/2014 Watson ................... G06F 21/10 709/231
2014/0122342 A1* 5/2014 Rajakarunanayake ...................... H04L 9/007 705/59
2015/0180846 A1* 6/2015 Nguyen .................. G06F 21/41 726/7
2015/0242597 A1* 8/2015 Danciu ................... G06F 21/10 726/30
2015/0295904 A1* 10/2015 Elias .................. H04N 21/4367 713/171
2015/0355879 A1* 12/2015 Beckhardt ............ H04N 21/654 700/94
2015/0358402 A1* 12/2015 Stolyar ..................... G06F 9/50 709/226
2016/0127334 A1* 5/2016 Bangole .................. H04L 67/12 713/171
2016/0165514 A1* 6/2016 Lou ....................... H04L 5/0007 370/328
2017/0083906 A1* 3/2017 Gaur .................... G06Q 20/367
2021/0120284 A1* 4/2021 Field ................ H04N 21/23113

* cited by examiner

System 100

SYSTEM AND METHOD OF PREAUTHORIZING CONTENT

BACKGROUND

Streaming content to computing devices (e.g., via Internet Protocol (IP)) is growing. The increase in demand for streaming content and the complexity of interacting systems that are necessary to access, entitle, and stream the content create more opportunity for potential problems. Problems such as latency, load, network impairments, and other system outages can delay the start of streamed content and results in frustrated customers, service calls, and lost revenue. Therefore, there is a need to start streamed content regardless of whether a problem on the system exists. These and other shortcomings are addressed in the present disclosure.

SUMMARY

It is to be understood that both the following general description and the following detailed description are exemplary and explanatory only and are not restrictive, as claimed. Provided are methods and systems for preauthorizing content access. The methods and systems of the present disclosure can be used to allow access to content by a device prior to processing a payment for the content and/or performing an entitlement check for the content. If subsequently the payment processing and/or the entitlement check fail, then the access can be revoked to terminate access by the content by the device.

In an aspect, an authorization system can receive a request for content from a device. The authorization system can determine whether a system condition (e.g., a bandwidth, a throughput, a latency, a load, an error rate, and the like) is satisfied and, if so, pre-authorize content access by the device. The authorization system can queue a authorization request to process in response to the request for content. The queue can be a priority queue where each authorization request has a priority assigned and the authorization request with the highest priority is served before authorization requests having a lower priority. The authorization system can authorize the request for content prior to processing the authorization request in response to the system condition being satisfied. The authorization system can then process the authorization request. If processing the authorization request fails, then the authorization system can revoke the authorization of access to the content.

In an aspect, an authorization system can receive a request for content from a device. The request for content can comprise a authorization request. The authorization system can determine whether a system condition of the authorization system is satisfied. If the system condition is satisfied, then the authorization system can queue the authorization request. The authorization system can transmit a request for entitlement to an entitlement system. The entitlement system can pre-entitle the content for access by the device. The authorization system can process the authorization request and if processing the authorization request fails, then the authorization system can send a request to the entitlement system to revoke the entitlement for the content. The next time that an entitlement check is performed for the device, the access of the content can be terminated.

In an aspect, an authorization system can receive a request for content from a device. The content can require an entitlement check before being accessed at the device. The authorization system can determine whether a system condition (e.g., a bandwidth, a throughput, a latency, a load, an error rate) is satisfied. If the system condition is satisfied, then the authorization system can send the entitlement to the device so that the device can have access to the content prior to the authorization system performing an entitlement check of the request for content. The authorization system can then process the entitlement check. If processing the entitlement check fails, then the authorization system can revoke the entitlement of access to the content.

In an aspect, an authorization system can receive a request for content from a device. The content can require an entitlement check before being accessed at the device. The authorization system can determine whether a system condition (e.g., a bandwidth, a throughput, a latency, a load, an error rate) is satisfied. If the system condition is satisfied, the authorization system can send the entitlement to access the content by the device prior to performing an entitlement check based on the request for content. The authorization system can determine an entitlement priority based on user information. The authorization system can position the entitlement check in a queue based on the entitlement priority. The queue can be a priority queue. A priority queue can be a queue where each entitlement check has an entitlement priority associated with it and the entitlement check request with the highest entitlement priority is served before entitlement check requests having lower entitlement priority. The authorization system can perform the entitlement check when the entitlement check has a highest entitlement priority in the queue. If processing the entitlement check fails, then the authorization system can revoke the entitlement to access to the content.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
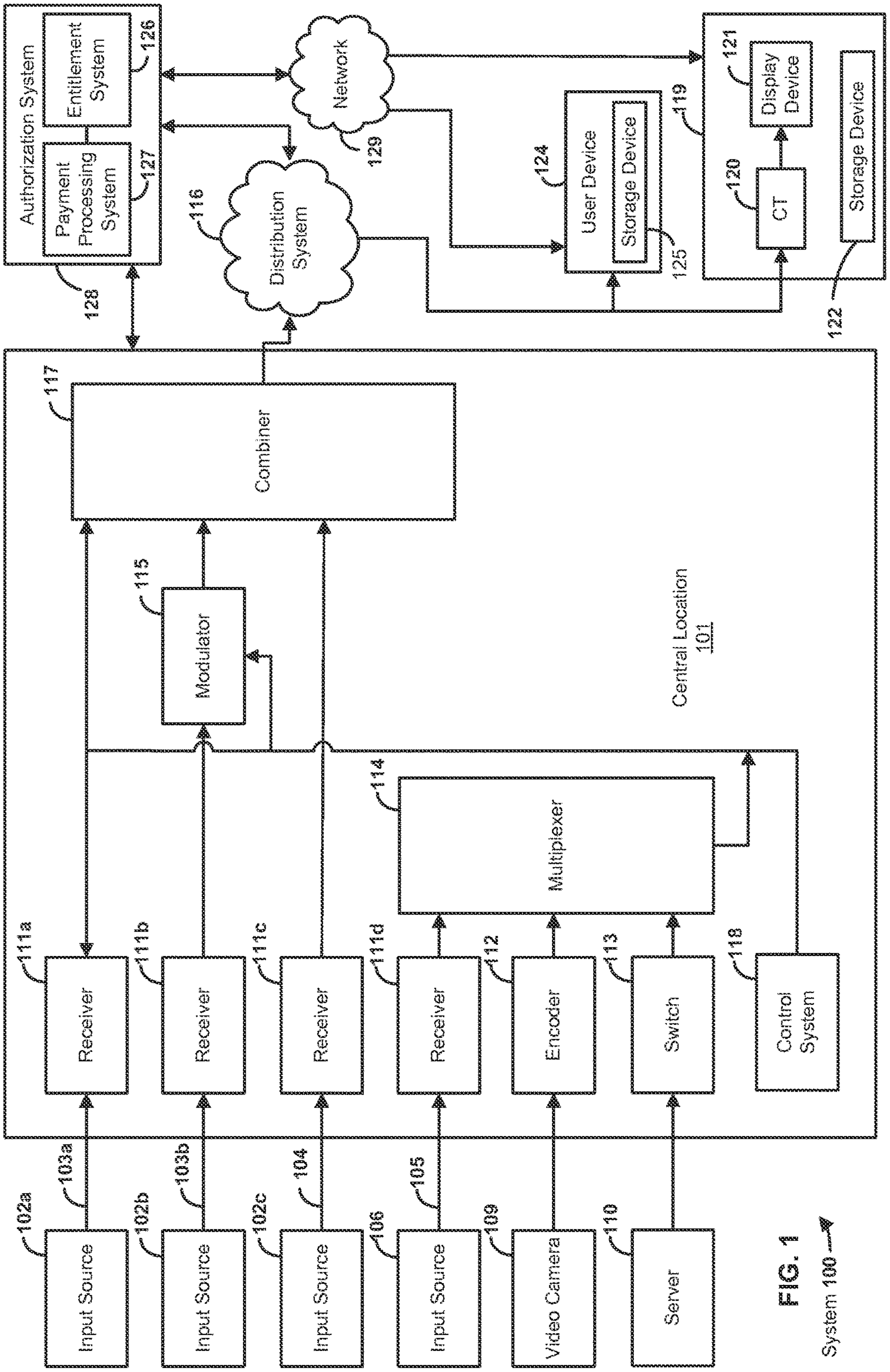
FIG. 1 is a block diagram of an exemplary network.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms “a,” “an,” and “the” include plural referents unless the context clearly dictates otherwise. Ranges may be expressed herein as from “about” one particular value, and/or to “about” another particular value. When such a range is expressed, another embodiment includes from the one particular value and/or to the other particular value. Similarly, when values are expressed as approximations, by use of the antecedent “about,” it will be understood that the particular value forms another embodiment. It will be further understood that the endpoints of each of the ranges are significant both in relation to the other endpoint, and independently of the other endpoint.

“Optional” or “optionally” means that the subsequently described event or circumstance may or may not occur, and that the description includes instances where said event or circumstance occurs and instances where it does not.

Throughout the description and claims of this specification, the word “comprise” and variations of the word, such as “comprising” and “comprises,” means “including but not limited to,” and is not intended to exclude, for example, other components, integers or steps. “Exemplary” means “an example of” and is not intended to convey an indication of a preferred or ideal embodiment. “Such as” is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present disclosure describes methods and systems for enabling access to content. In an aspect, certain types of content can require performance of an entitlement check and/or a processing of an authorization request prior to access by and/or delivery to a device. The authorization request can comprise a payment authorization request. The content types can comprise, for example, one or more of, premium content (e.g., “pay channels” or otherwise encrypted content), video on demand assets (VOD), pay-per-view (PPV) events, pay-per-listen (PPL), audio on demand (A), combinations thereof, and the like. The methods and systems disclosed herein can be configured to pre-authorize and/or pre-entitle access to the content so that the content can be transmitted (e.g., sent, streamed, provided, delivered) to the device prior to performance of the entitlement check and/or the processing of the authorization request. If the entitlement check and/or the processing of the authorization request fails, access to and/or transmission of the content can be discontinued (e.g., by revoking the entitlement and/or sending a message to a content server to terminate transmission of the content to the device).

The methods and systems disclosed can be configured to pre-authorize and/or pre-entitle access to the content based on one or more system conditions. Examples of system conditions can include, but are not limited to, a predetermined bandwidth, a throughput, a latency, a load, an error rate, combinations thereof, and the like. The status of the one or more system conditions can impact the time involved with performing the entitlement check and/or the processing of the authorization request. For example, there could be a large spike in traffic experienced by a payment processing system in the time leading up to a live PPV event. The result of the large spike in traffic could delay payment processing, which will delay access to the live PPV event. The end result is that a user could miss the beginning of the live PPV event because the user was not authorized to view the PPV event until after the payment has been processed. Accordingly, the methods and systems disclosed can monitor the one or more system conditions and implement pre-authorization and/or pre-entitlement processes to permit users to access the content despite not having passed the entitlement check and/or the processing of the authorization request. If the one or more system conditions are such that a user would experience minimal or no delay in consuming the content, then the methods and systems can perform the entitlement check and/or the processing of the authorization request prior to providing access to the content. If the one or more system conditions are such that a user would experience delay in consuming the content, then the methods and systems can perform the entitlement check and/or the processing of the authorization request after providing access to the content.

The methods and systems disclosed can be configured to pre-authorize and/or pre-entitle the access to the content based on user information. Examples of user information can include, but are not limited to, a payment history, a credit score, a payment type, a type of request, content requested, a preferred user status, a geographic location of a user, combinations thereof, and the like. The user information can indicate a likelihood that a user will or will not pass the entitlement check and/or the processing of the authorization request. For example, a user may have a history of failed authorization requests. In that instance, the methods and systems can require that the entitlement check and/or the processing of the authorization request be performed prior to providing content access to the user. In another example, the user information may indicate that a user subscribes to a premium level of service. In that instance, the methods and systems can provide access to the content by the user prior to performing the entitlement check and/or the processing of the authorization request.

In an aspect, when the methods and systems disclosed are pre-authorizing and/or pre-entitling the access to the content (e.g., based on the one or more system conditions and/or the user information), the entitlement check(s) and/or the processing of the authorization request(s) can be placed into a queue. The entitlement check(s) and/or the authorization request(s) can be prioritized in the queue based on the user information. For example, an authorization request and/or an entitlement check of a user with a delinquent account can be placed in the front of the queue while other authorization requests and/or entitlement checks from users with current accounts can be placed in the back of the queue. The result is performing the entitlement check(s) and/or the processing of the authorization request(s) for users having a higher risk of failing the entitlement check(s) and/or the processing of the authorization request(s) before users having a lower risk.

The methods and systems disclosed can utilize a payment processing system and an entitlement system. The payment processing system can be configured to transmit a signal to the entitlement system to grant entitlement and/or revoke entitlement to content on behalf of one or more users/devices. The payment processing system and the entitlement system can be collectively referred to as an authorization system. The authorization system can receive a request for content from a device. The request for content can comprise a authorization request and user information. If the authorization system is in a pre-entitlement and/or pre-authorization mode, the authorization request can be queued and the payment processing system can transmit a signal to the entitlement system to grant entitlement for the content to the device. The entitlement system can grant the entitlement and the content can be accessed by the device. Once the authorization request is processed and the payment processing system determines that the authorization request failed, then the payment processing system can transmit a signal to the entitlement system to revoke the entitlement for the content. The entitlement system can revoke the entitlement at the device or at the entitlement system, resulting in termination of access to the content. Optionally, an entitlement check can be performed again and if the entitlement system determines there is no entitlement, the content transmission from the content server can be terminated.

FIG. 1 illustrates various aspects of an exemplary system 100 in which the present methods and systems can operate. The present disclosure relates to systems and methods for preauthorizing access to content. Those skilled in the art will appreciate that present methods may be used in systems that employ both digital and analog equipment. One skilled in the art will appreciate that provided herein is a functional description and that the respective functions can be performed by software, hardware, or a combination of software and hardware.

In an aspect, the system 100 can comprise a central location 101 (e.g., a headend, a processing center, etc.), which can receive content (e.g., video, audio, images, text, application files, data, input programming, and the like) from multiple sources. The central location 101 can combine the content from the various sources and can distribute the content to user (e.g., subscriber) locations (e.g., user location 119) via distribution system 116.

The central location 101 can create content or receive content from a variety of sources 102*a*, 102*b*, 102*c*. The content can be transmitted from the source to the central location 101 via a variety of transmission paths, such as wireless paths (e.g., satellite paths 103*a*, 103*b*) and terrestrial path 104. The central location 101 can also receive content from an input source 106 via a direct line 105. Other input sources can comprise capture devices, such as a video camera 109, a server 110, and/or the like. The content provided by the content sources can comprise, a single content item, a portion of a content item (e.g., content fragment), a content stream, a multiplex that includes several content items, and/or the like.

The central location 101 can comprise one or a plurality of receivers 111*a*, 111*b*, 111*c*, 111*d* that are associated with one or more corresponding input sources. The central location 101 can comprise one or more encoders 112, switches 113, multiplexers, and/or the like. For example, an encoder 112 can compress, encrypt, transform, and/or otherwise encode content. As a further example, the encoder 112 can encode content based on one or more compression standards, such as MPEG. As another example, the encoder can receive content from the video camera 109 and/or other source and apply one or more encoding algorithms to the received content. A switch 113 can provide access to server 110, which can be a Pay-Per-View server, a data server, an internet router, a network system, a phone system, and the like. Some signals may require additional processing, such as signal multiplexing, prior to being modulated. Such multiplexing can be performed by multiplexer 114.

The central location 101 can comprise one or more modulators 115 for interfacing with a distribution system 116. As an example, a modulator can receive content from a receiver 111, encoder 112, multiplexer 114, and/or the like. A modulator 115 can convert the received content into a modulated output signal suitable for transmission over the distribution system 116. For example, a modulator 115 can map portions of the content to data bits expressed as signals (e.g., sinusoidal signals) at corresponding subcarrier frequencies of a data symbol. The output signals from the modulators 115 can be combined, using equipment such as a combiner 117, for input into the distribution system 116.

A control system 118 can permit a system operator to control and monitor the functions and performance of the system 100. The control system 118 can interface, monitor, and/or control a variety of functions, including, but not limited to, the channel lineup for a television system, billing for each user, conditional access for content distributed to users, user information, and the like. The control system 118 can provide input to the modulators for setting operating parameters, such as system specific MPEG table packet organization or conditional access information. The control system 118 can be located at central location 101 or at a remote location.

The distribution system 116 can distribute content from the central location 101 to user locations, such as user location 119. The distribution system 116 can be an optical fiber network, a coaxial cable network, a hybrid fiber-coaxial network, a wireless network, a satellite system, a direct broadcast system, or any combination thereof. There can be a multitude of user locations connected to distribution system 116. At user location 119, there may be an interface comprising a decoder 120, such as a gateway or communications terminal (CT) that can decode, if needed, the signals for display on a display device 121, such as on a television set (TV) or a computer monitor. Various wireless devices may also be connected to a network 129 at, or proximate, user location 119. Those skilled in the art will appreciate that the signal can be decoded in a variety of equipment, including a CT, a fixed or mobile computing device, a TV, a monitor, or a satellite receiver. In an exemplary aspect, the methods and systems disclosed can be located within, or performed on, one or more wireless devices, CTs 120, display devices 121, central locations 101. DVR's, home theater PC's, and the like. In an aspect, a storage device 122 can be in communication with one or more of the CT 120, the display device 121, and the central location 101 to send/receive content therebetween. As a further example, the storage device 122 can be located remotely from the user location 119, such as a network storage device.

User location 119 is necessarily not fixed. By way of example, a user can receive content from the distribution system 116 on a mobile device, such as a laptop computer, a PDA, a smartphone, a GPS, a vehicle entertainment system, a portable media player, and the like.

A user device 124 can receive content from the distribution system 116 for consuming content on the user device 124. As an example, consuming content can comprise providing audio and/or video, displaying images, facilitating an audio or visual feedback, tactile feedback, and the like. However, other content can be consumed via the user device 124. The user device 124 can be a CT 119, a set-top box, a television, a computer, a smartphone, a laptop, a tablet, a multimedia playback device, a portable electronic device, and the like. As an example, the user device 124 can be an Internet Protocol compatible device for receiving signals via the network 129 such as the Internet or some other communications network for providing content to the user. It is understood that other display devices and networks can be used. It is further understood that the user device 124 can be a widget or a virtual device for displaying content in a picture-in-picture environment such as on the display device 121, for example. As an example, a storage device 125 can be in communication with one or more of the user device 124 and the central location 101 to send/receive content therebetween. As a further example, the storage device 125 can be located remotely from the user device 124, such as a network storage medium.

In an aspect, an authorization system 128 can be in communication with one or more of the CT 120 and the user device 124. The authorization system 128 can comprise an entitlement system 126 and/or a payment processing system 127. The authorization system 128 can receive a request for content from a device such as the user device 124 or CT 120. The request for content can be a request to consume (e.g., store, produce audio of, render, pay for, combinations thereof, and the like) the content. In an aspect, certain types of content can require performance of an entitlement check and/or a processing of an authorization request by the entitlement system 126 and/or the payment processing system 127, respectively, prior to access by and/or delivery to the device. The content types can comprise at least one of a premium content (e.g., "pay channels" or otherwise encrypted content), video on demand assets (VOD), pay-per-view (PPV) events, pay-per-listen (PPL), audio on demand (A), combinations thereof, and the like. The authorization system 128 can determine whether the content requested requires the processing of the authorization request and/or performance of the entitlement check before the content can be accessed by and/or delivered to the device.

If an entitlement check is required before the content can be accessed by and/or delivered to the device, the entitlement system 126 can perform the entitlement check. The entitlement system 126 can be in communication with one or more of the CT 120 and the user device 124 (e.g., or other devices) to determine entitlement to access the content for a particular user and/or a device. In an aspect, a user and/or a device can have certain user rights associated with the content. As an example, a user may have rights to store (e.g., buffer, cache, temporarily store, store long-term, store locally, store remotely, and the like) certain programming on a digital recorder. However, other users and/or devices may not have the rights to store the same programming. In an aspect, when content is requested by the user and/or the device from the central location 101, the central location 101 may determine the content requires entitlement before the central location 101 provides access to and/or transmits the content to the device. The entitlement system 126 can perform an entitlement check to determine whether the user and/or device has access to the content requested. If the device is entitled to the content, the entitlement system 126 can send an entitlement to the device which can allow the device to access the content requested. The entitlement system 126 can send a notification to the central location 101 of the entitlement, which can cause the central location to transmit the content requested to the device.

The authorization system 128 can determine whether the content requested requires the processing of the authorization request before the content can be accessed by and/or transmitted to the device. The authorization system 128 can comprise the payment processing system 127 which can be configured to process payment information associated with specific content from a content provider or content owner. The payment processing system 127 can be used for content purchase and/or content rentals. Upon payment, the payment processing system 127 can authorize access to the content by the device. In another aspect, the payment processing system 127 can be configured to provide an entitlement option and/or interact with the entitlement system 126 to provide access to and/or cause to transmit content to a device. As an example, the entitlement option can be in the form of popup dialog, overlay, email, text, or the like indicating lack of entitlement and the information related to purchase the entitlement (e.g., price for the content). In another aspect, the payment processing system 127 can be configured to process payment information such as, through a user account (e.g., account information as a subscriber or customer of a content provider) and/or other payment information (e.g., credit card information, bank account information) for content authorization/entitlement purchase. The payment information can be stored in a storage device such as storage devices 122 and 125. In an aspect, a request for content can comprise the payment information. In another aspect, the payment processing system 127 can locate the user account to receive payment information or bill the amount due to the user's account. Upon successful purchase, an entitlement and/or authorization can be transmitted to the device. The payment processing system 127 can send a request for the entitlement to be sent by the entitlement system 126 to the device. The entitlement system 126 can issue the entitlement. The entitlement can be used for content purchase and/or content rental. As an example, the entitlement can be a license, an encryption key, a password, an entitlement token, combinations thereof, and the like.

The authorization system 128 can switch between two modes of operation. A first mode of operation can be a preauthorization mode whereupon receiving a request for content, the authorization system 128 can pre-authorize and/or pre-entitle access to the content. The pre-authorization and/or pre-entitlement granted for the preauthorization mode can be before an entitlement check and/or processing an authorization request to pay for the content. The pre-authorization and/or pre-entitlement can be made so that a user of the device can have access to the content without delay created by the entitlement system 126 and/or the payment processing system 127 processing the request for content.

A second mode of operation can be a check authorization first mode. The check authorization first mode can be a mode wherein performing the entitlement check and/or processing the authorization request is completed before the device is authorized and/or entitled access to the content requested and where the access to and/or delivery of the requested content depends on an outcome of the entitlement check and/or processing the authorization request.

In an aspect, which mode of operation (e.g., preauthorization mode or check authorization first mode) the payment processing system and/or the entitlement system is in can depend on a presence of a system condition. The authorization system 128 can determine whether any system condition exists on the system 100, the network 129, the distribution system 116, the authorization system 128, combinations thereof and the like. Examples of system conditions can include, but are not limited to, a predetermined bandwidth, a throughput, a latency, a load, an error rate, combinations thereof, and the like. The authorization system 128 can monitor for the system conditions and/or receive measurements indicative of the system condition from other devices or sensors on the system 100, the network 129, the distribution system 116, the authorization system 128, combinations thereof, and the like. If the system condition exists, then the authorization system 128 can switch from the check authorization first mode to the preauthorization mode or vice versa. When the system condition does not exist the authorization system 128 can switch back to the mode the authorization system 128 was in before the system condition existed.

The authorization system 128, when in the preauthorization mode, can queue the authorization requests and/or the entitlement checks while the payment processing system 127 and/or the entitlement system 126, respectively, is processing the authorization requests and/or the entitlement checks. The queue can be a priority queue where each of the authorization requests and/or the entitlement checks are assigned a priority and the authorization requests and/or the entitlement checks with the highest priority are processed before the authorization requests and/or the entitlement checks with the lowest priority.

The authorization system 128 can determine a processing priority/entitlement priority of the authorization request and/or the entitlement check in relation to a plurality of authorization requests and/or entitlement checks. The processing priority/entitlement priority can be based on user information. Examples of user information can include, but are not limited to, a payment history, a credit score, a payment type, a type of request, content requested, a preferred user status, a geographic location of a user, combinations thereof, and the like. The user information can be stored in a storage device such as storage device 122 and 125 and sent with the request for content by the device. The storage devices 122 and 125 can be remote storage devices and the authorization system 128 can retrieve the user information upon receipt of the request for content. The request for content can comprise an identifier that can identify the device and/or user. The identifier can be used to retrieve the user information associated with identifier. In another aspect, the user information can be stored in the control system 118 and the user information can be retrieved by the authorization system 128 upon receipt of the request for content.

The user information can indicate a likelihood that a user will or will not pass the entitlement check and/or the processing of the authorization request. The authorization system 128 can compare the user information to a set of one or more criteria to determine the likelihood that a user will or will not pass the entitlement check and/or the processing of the authorization request. Based on the likelihood of passing or not passing, the authorization system 128 can determine a processing priority/entitlement priority. The requests for content with the highest priority can have the least likelihood of passing the entitlement check and/or the processing of the authorization request while the requests being the most likely to pass can have the lowest priority. Based on the processing priority/entitlement priority, the authorization system 128 can position the authorization request and/or the entitlement check in the queue.

The queue can be dynamically updated based on a priority of a new authorization request and/or a new entitlement check being received by the authorization system 128. The queue can be implemented with a heap, an unordered array, a linked list, combinations thereof, and the like. The queue can be a buffer implementing a first in first out (FIFO) algorithm for processing the authorization request and/or the entitlement check. The queue can be a stack implementing a last in first out (LIFO) algorithm for processing the authorization request and/or the entitlement check.

The user information can be used by the authorization system 128 to determine which of the preauthorization mode and the check authorization first mode the authorization system 128 should be in for a particular user of a device such as the user device 124 or CT 120. The methods and systems disclosed can be configured to pre-authorize and/or pre-entitle the access to the content based on the user information. The user information can indicate a likelihood that a user will or will not pass the entitlement check and/or the processing of the authorization request. The authorization system 128 can compare the user information to a set of one or more criteria to determine the likelihood that a user will or will not pass the entitlement check and/or the processing of the authorization request. Based on the likelihood of passing or not passing, the authorization system 128 can determine which of a preauthorization mode or check authorization first mode a particular user requesting content should be in. For those users having a high likelihood of passing an entitlement check and/or processing an authorization request, the authorization system 128 can assign a preauthorization mode. Users less likely pass the entitlement check and/or processing an authorization request can be in the check authorization first mode.

In an aspect, during the preauthorization mode, the entitlement check and/or processing the authorization request can be performed at the respective entitlement system 126 and payment processing system 127 after the authorization system 128 has pre-authorized and/or pre-entitled access to the content requested by the device. The entitlement check can fail such as due to system errors, the entitlement check determining that the device or the user of the device does not have entitlement to the content requested, combinations thereof, and the like. In an aspect, processing the authorization request can fail such as due to system errors, the payment processing system 127 determining that the user has insufficient funds while processing an authorization request, and the like. If the entitlement check and/or processing the authorization request fail, then the authorization system 128 can revoke access to the content by the device. The authorization system 128 comprising the payment processing system 127, and/or the entitlement system 126 can revoke the entitlement sent to the device. The authorization system 128 can revoke a corresponding entitlement at the authorization system 128, the payment processing system 127, and/or the entitlement system 126. The authorization system 128, can terminate or cause the termination of transmission of content that was preauthorized to access. Optionally, an entitlement check can be performed again and if the entitlement system 126 determines there is no entitlement, the content transmission from the content server (e.g., server 110) can be terminated. Other aspects are contemplated to revoke authorization depending on the entitlement/authorization scheme implemented by the network.

The methods and systems disclosed can utilize the payment processing system 127 and the entitlement system 126. The payment processing system 127 can be configured to transmit a signal to the entitlement system 126 to grant entitlement and/or revoke entitlement to content on behalf of one or more users/devices. The payment processing system 127 and the entitlement system 126 can be collectively referred to as an authorization system 128. The authorization system 128 can receive a request for content from a device. The request for content can comprise an authorization request and user information. If the authorization system 128 is in the preauthorization mode, the authorization request can be queued and the payment processing system 127 can transmit a signal to the entitlement system 126 to grant entitlement for the content to the device. The entitlement system 126 can grant the entitlement and the content can be accessed by the device. Once the authorization request is processed and the payment processing system 127 determines that the authorization request failed, then the payment processing system 127 can transmit a signal to the entitlement system 126 to revoke the entitlement for the content. The entitlement system 126 can revoke the entitlement at the device or at the entitlement system 126, resulting in termination of access to the content. Optionally, an entitlement check can be performed again and if the entitlement system 126 determines there is no entitlement, the content transmission from the content server (e.g., server 110) can be terminated.

Figure 2:
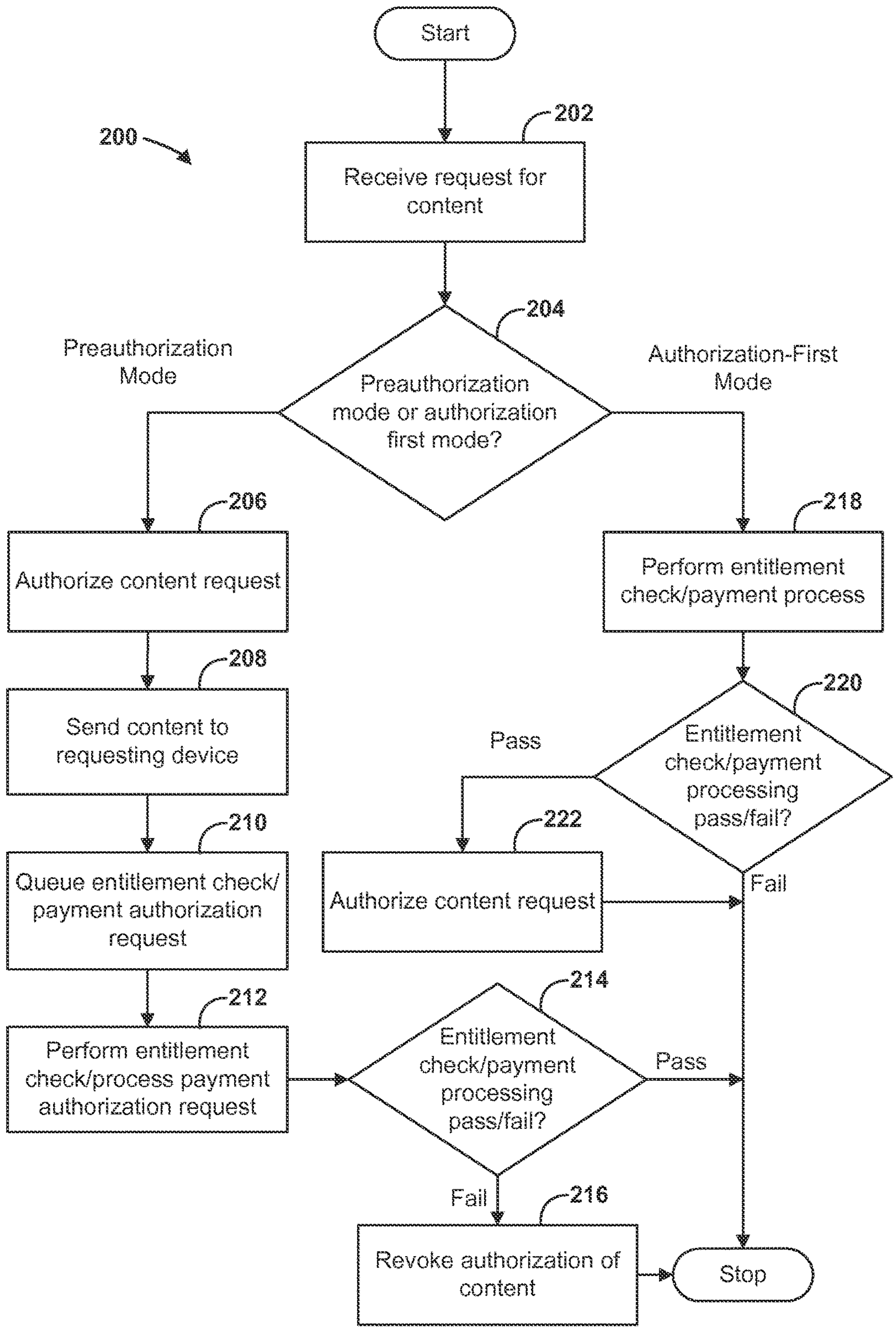
FIG. 2 is a flow chart of an exemplary method.

FIG. 2 illustrates a method 200 for authorizing access to content. In an aspect, in step 202, an authorization system 128 can receive a request for content. The request for content can be received by an authorization system 128 comprising a payment processing system 127 and/or and entitlement system 126. The request for content can be transmitted by a device such as the user device 124, the CT 120, or other device at the user location 119. The request for content can be transmitted over the network 129, the distribution system 116, combinations thereof and the like. The request for content can comprise payment information such as a user account (e.g., account information as a subscriber or customer of a content provider) and/or other payment information (e.g., credit card information, bank account information). The content requested can comprise a content type. Content types can include, for example, one or more of, premium content (e.g., "pay channels" or otherwise encrypted content), video on demand assets (VOD), pay-per-view (PPV) events, pay-per-listen (PPL), audio on demand (A), combinations thereof, and the like.

In step 204, the authorization system 128 can determine whether to activate a preauthorization mode or a check authorization first mode. The authorization system 128 can determine which of the preauthorization mode or the check authorization first mode the authorization system 128 is currently operating under. In the preauthorization mode, upon receiving the request for the content, the authorization system 128 can automatically pre-authorize/pre-entitle the device (e.g., the user device 124 or the CT 120) access to the content. In the check authorization first mode, the entitlement check and/or processing of the authorization request is performed prior to authorizing/entitling the device access to the content.

The determination of whether the authorization system should be in the preauthorization mode or the check authorization first mode can be based on one or more system conditions and/or user information associated with the request for the content. The authorization system 128, the payment processing system 127, and/or the entitlement system 126 can determine whether a system condition is satisfied. In an aspect, based on the system condition being satisfied, the authorization system 128 can determine which of the preauthorization mode or the check authorization first mode the authorization system 128 should be in. The system condition can include, but is not limited to, a predetermined bandwidth, a throughput, a latency, a load, an error rate, combinations thereof, and the like. The system condition can be a condition of the authorization system 128 and/or other devices on the system 100, the distribution system 116, the network 129, combinations thereof, and the like. The authorization system 128 can monitor for the system conditions and/or receive measurements from other devices and/or sensors on the system 100. For example, if a load of requests for content for a time period exceeds a threshold, then the authorization system 128 can switch from the check authorization first mode to the preauthorization mode to make sure users do not experience any delay in consuming the content requested. As another example, there could be a large spike in traffic experienced by the payment processing system 127 in the time leading up to a live PPV event. The result of the large spike in traffic could delay payment processing, which will delay access to the live PPV event. Therefore, the authorization system 128 can determine that the rate at which the payment processing system 127 is processing payments is less than the rate at which the payment processing system 127 is receiving authorization requests, then the authorization system 128 can switch to the preauthorization mode.

The authorization system 128 can determine which of the preauthorization mode or the check authorization first mode the authorization system 128 should be in based on user information. The user information can comprise a payment history, a credit score, a payment type, a type of request, content requested, a preferred user status, a geographic location of a user, combinations thereof, and the like. The user information can be received from a storage device on the user device 124, CT 120, and/or another user location 119 device with the request for content. In another aspect, the payment processing system 127 and/or the entitlement system 126 can retrieve the user information from a storage device on the system 100. The control system 118 can store the user information and the payment processing system 127 and/or the entitlement system 126 can retrieve the user information from the control system 118. In an aspect, a user identifier and/or a device identifier from the request for content can be used to obtain user information from the user information in the storage device and/or control system 118 by searching for the user identifier and/or the device identifier in the storage device and obtaining any user information associated with the identifiers. As an example, the authorization system 128 can implement the check authorization first mode for users and/or devices with user information that does not meet one or more criteria. The authorization system 128 can implement the preauthorization mode for users and/or user devices with user information that does meet the criterion. For example, a criterion can be whether a user's account is delinquent. A user with a delinquent account can be associated with the check authorization first mode while a user with a current account can be associated with the preauthorization mode. In another example, the user information may indicate that a user subscribes to a premium level of service. In that instance, the methods and systems can provide access to the content prior to performing the entitlement check and/or the processing of the authorization request.

The authorization system 128 can determine that the authorization system 128 should be in the preauthorization mode and the method 200 can continue to step 206. In step 206, the entitlement system 126 can pre-entitle and/or preauthorize the content requested to be accessed by the device such as the user device 124 or the CT 120. The entitlement system 126 can send an entitlement such as a license, an encryption key, a password, an entitlement token, combinations thereof, and the like to the device. The entitlement can allow the device access to the content. The entitlement system 128 can send an entitlement message to a content server to send the requested content to the device. In another aspect, the requirement for an entitlement check can simply be bypassed by the authorization system 128.

If processing an authorization request is required, then the payment processing system 127 can pre-authorize access to the content by the device. Likewise, if processing an authorization request is required and the content requires an entitlement check, the payment processing system 127 can send a request to the entitlement system 126 to grant entitlement to the requested content after receiving a authorization request. The entitlement system 126 can grant entitlement to the device for the content requested.

In step 208, the content server (e.g., server 110) can send the content to the device. In an aspect, step 208 may be performed prior to step 206 or before the device requested access to the content in step 202. For example, the content may have been transmitted to the device but the device needs an entitlement to access the content. A portion of the content can be sent to the device. The portion of the content can be a certain number of frames and/or a particular duration of the content. In another example, the content and/or the portion of the content that has been preauthorized and/or pre-entitled can be sent at a different bit rate than content that has been authorized and/or entitled such as a lower bit rate. The content and/or portion of the content can be pre-recorded or made on the fly.

In step 210, the authorization system 128 can queue an entitlement check and/or a authorization request for the requested content. The queue can be a priority queue. The authorization system 128 comprising the payment processing system 127, and/or the entitlement system 126 can determine a priority (e.g., processing priority and/or entitlement priority) of the authorization request and/or the entitlement check in relation to the plurality of authorization requests and/or the plurality of entitlement checks. The priority can be based on the user information. Examples of user information can include, but are not limited to, a payment history, a credit score, a payment type, a type of request, content requested, a preferred user status, a geographic location of a user, combinations thereof, and the like. The user information can be stored in a storage device such as storage device 122 and 125 and sent with the request for content by the device. The storage devices 122 and 125 can be remote storage devices and the authorization system 128 can retrieve the user information upon receipt of the request for content. The request for content can comprise an identifier that can identify the device and/or user. The identifier can be used to retrieve the user information associated with identifier. In another aspect, the user information can be stored in the control system 118 and the user information can be retrieved by the authorization system 128 upon receipt of the request for content.

The user information can indicate a likelihood that a user will or will not pass the entitlement check and/or the processing of the authorization request. The authorization system 128 can compare the user information to one or more criteria to determine the likelihood that a user will or will not pass the entitlement check and/or the processing of the authorization request. Based on the likelihood of passing or not passing, the authorization system 128 can determine the priority. The requests for content with the highest priority can have the least likelihood of passing the entitlement check and/or the processing of the authorization request. The requests most likely to pass the entitlement check and/or the processing of the authorization request can have the lowest priority.

Based on the priority, the authorization system 128 can position the authorization request and/or the entitlement check in the queue. For example, a user with a delinquent user account can have a high priority. As another example, a user with a current user account can have a lower priority. In another example, a user with a preferred account can have a lowest priority. The authorization requests with the highest priority can be placed at the beginning of the queue. In another example, the authorization requests with the lowest priority can be placed at the end of the queue. In these examples, the payment processing system 127 can process the authorization requests of the most risky users first so that when the authorization system 128 is in a preauthorization mode, the users that are deemed risky will have payments processed first to minimize the amount of time preauthorized/pre-entitled content is accessed by the risky users before the authorization system 128 determines to revoke the authorization/entitlement.

The queue can be a priority queue that is dynamically updated based on the processing priority/entitlement priority of a new request for content being received by the authorization system 128, an entitlement check being processed, a authorization request being processed, and the like. The queue can be implemented with a heap, an unordered array, a linked list, combinations thereof, and the like by a storage device. The queue can be a buffer implementing a first in first out (FIFO) algorithm for processing the authorization request and/or the entitlement check. The queue can be a stack implementing a last in first out (LIFO) algorithm for processing the authorization request and/or the entitlement check.

In step 212, the authorization system 128, comprising the payment processing system 127 and/or the entitlement system 126, can process the authorization request and/or the entitlement check. In step 214, if processing the authorization request and/or the entitlement check passes, then the device can have continued access to the content according to how the content was entitled in step 206.

In step 214, if processing the authorization request and/or the entitlement check fails, then the payment processing system 127, and/or the entitlement system 126 can revoke the pre-authorization and/or pre-entitlement in step 216. For example, the entitlement system 126 and/or the payment processing system 127 can revoke the pre-entitlement and/or the pre-authorization at the device or at the entitlement system 126 and/or payment processing system 127, resulting in termination of access to the content. In another example, the entitlement system 126 and/or payment processing system 127 can transmit a signal to the content server to end transmission of the content requested. Optionally, an entitlement check can be performed again and if the entitlement system 126 determines there is no entitlement, the content transmission from the content server can be terminated. 2

Returning to step 204, if the authorization system 128 determines that the authorization system 128 should be in the check authorization first mode, then the method 200 can continue to step 218. In step 218, the entitlement system 126 can perform the entitlement check and/or the payment processing system 127 can process the authorization request when the request for content is received. In step 220, the authorization system 128 comprising the payment processing system 127 and/or the entitlement system 126 can determine whether the entitlement check and/or processing the authorization request passed or failed. If the entitlement check and/or processing of the authorization request passed, then, in step 222, the authorization system 128 can allow access to the content requested. If the entitlement check and/or processing of the authorization request failed, then the request for content can be denied. The payment processing system 127, and/or the entitlement system 126 can send a notification to the device that processing the authorization request and/or the entitlement check failed.

Figure 3:
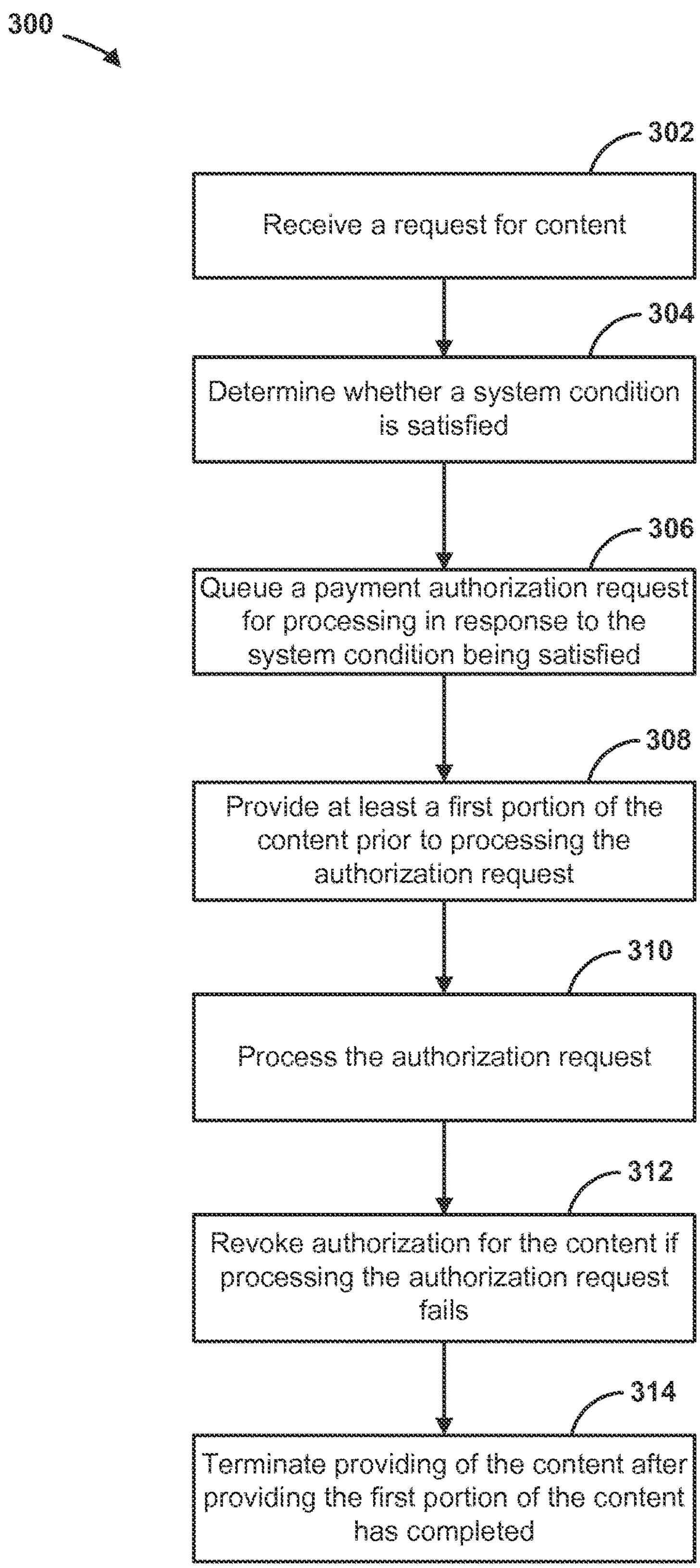
FIG. 3 is a flow chart of an exemplary method.

FIG. 3 illustrates a method 300 for preauthorizing content. In step 302, a request for content can be received. In an aspect, the request for content can be received by an authorization system 128 comprising a payment processing system 127 and/or an entitlement system. The request for content can be transmitted by a device such as the user device 124, the CT 120, or other device at the user location 119. The request for content can be transmitted over the network 129, the distribution system 116, combinations thereof and the like. The request for content can comprise payment information such as a user account (e.g., account information as a subscriber or customer of a content provider) and/or other payment information (e.g., credit card information, bank account information). The content requested can comprise a content type. Content types can include, for example, one or more of, premium content (e.g., "pay channels" or otherwise encrypted content), video on demand assets (VOD), pay-per-view (PPV) events, pay-per-listen (PPL), audio on demand (A), combinations thereof, and the like.

In step 304, whether a system condition is satisfied can be determined. The authorization system 128 comprising the payment processing system 127 and/or entitlement system 126 can determine whether the system condition is satisfied. In an aspect, based on a system condition being satisfied, the authorization system 128 can determine which of a preauthorization mode or a check authorization first mode the authorization system 128 should be in. The system condition can include, but is not limited to, a predetermined bandwidth, a throughput, a latency, a load, an error rate, combinations thereof, and the like. The system condition can be a condition of the authorization system 128 and/or other devices on the system 100, the distribution system 116, the network 129, combinations thereof, and the like. As an example, the system condition can be a threshold number of authorization requests during a time period. The authorization system 128 can monitor for the system conditions and/or receive measurements from other devices and/or sensors on the system 100. For example, if a load of requests for content for a time period exceeds a threshold, then the authorization system 128 can switch from the check authorization first mode to the preauthorization mode to ensure minimal delay in accessing the content requested. As another example, there could be a large spike in traffic experienced by the payment processing system 127 in the time leading up to a live PPV event. The result of the large spike in traffic could delay payment processing, which will delay access to the live PPV event. Therefore, the authorization system 128 can determine that the rate at which the payment processing system 127 is processing payments is less than the rate at which the payment processing system 127 is receiving authorization requests, then the authorization system 128 can switch to the preauthorization mode.

In step 306, an authorization request can be queued for processing in response to the system condition being satisfied. The authorization system 128 comprising the payment processing system 127 and/or the entitlement system 126 can queue the authorization request for processing. The queue can be a priority queue. The authorization system 128 comprising the payment processing system 127 can determine a processing priority of the authorization request in relation to the plurality of authorization requests. The processing priority can be based on the user information. Examples of user information can include, but are not limited to, a payment history, a credit score, a payment type, a type of request, content requested, a preferred user status, a geographic location of a user, combinations thereof, and the like.

The user information can be stored in a storage device such as storage device 122 and 125 and sent with the request for content by the device. The storage devices 122 and 125 can be remote storage devices and the authorization system 128 can retrieve the user information upon receipt of the request for content. The request for content can comprise an identifier that can identify the device and/or user. The identifier can be used to retrieve the user information associated with identifier. In another aspect, the user information can be stored in the control system 118 and the user information can be retrieved by the authorization system 128 upon receipt of the request for content.

The user information can indicate a likelihood that a user will or will not pass the entitlement check and/or the processing of the authorization request. The authorization system 128 can compare the user information to one or more criteria to determine the likelihood that a user will or will not pass the entitlement check and/or the processing of the authorization request. Based on the likelihood of passing or not passing, the authorization system 128 can determine a processing priority. The requests for content with the highest processing priority can have the least likelihood of passing the entitlement check and/or the processing of the authorization request. The requests most likely to pass the entitlement check and/or the processing of the authorization request can have the lowest processing priority. Based on the processing priority, the authorization system 128 can position the authorization request and/or the entitlement check in the queue.

For example, a user with a delinquent user account can have a high processing priority. As another example, a user with a current user account can have a lower processing priority. In another example, a user with a preferred account can have a lowest processing priority. The authorization requests with the highest processing priority can be placed at the beginning of the queue. In another example, the authorization requests with the lowest processing priority can be placed at the end of the queue. In these examples, the payment processing system 127 can process the authorization requests of the most risky users first so that when the authorization system 128 is in a preauthorization mode, the users that are deemed risky will have payments processed first to minimize the amount of time preauthorized content is accessed by the risky users before the authorization system 128 determines to revoke the pre-authorization.

The queue can be a priority queue that is dynamically updated based on the processing priority of a new request for content being received by the authorization system 128, an entitlement check being processed, an authorization request being processed, and the like. The queue can be implemented with a heap, an unordered array, a linked list, combinations thereof, and the like by a storage device. The queue can be a buffer implementing a first in first out (FIFO) algorithm for processing the authorization request and/or the entitlement check. The queue can be a stack implementing a last in first out (LIFO) algorithm for processing the authorization request and/or the entitlement check.

In step 308, at least a first portion of the content prior to processing the authorization request can be provided. The first portion of the content can be provided to the device requesting the content. In an aspect, the request for content can be authorized prior to processing the authorization request. The content requested, or a portion thereof (e.g., a particular length of time or a number of frames, at a normal or altered bit rate), can be transmitted to the device. If processing an authorization request is required, then the payment processing system 127 can pre-authorize access to the content for the device. In an aspect, an authorization message can be sent to a content server to transmit content. Likewise, if processing an authorization request is required and the content requires an entitlement check, the payment processing system 127 can send a request to the entitlement system 126 to grant entitlement to the requested content after receiving an authorization request. The entitlement system 126 can grant entitlement to the device for the content requested.

In step 310 processing the authorization request can be performed at the payment processing system 127 after the authorization system 128 has pre-authorized the device to access the content requested. Processing the authorization request can fail such as due to system errors, the payment processing system 127 determining that the user has insufficient funds while processing an authorization request, and the like.

In step 312, if processing the authorization request fails, the authorization system 128 can revoke the preauthorization of the access of the content by the device. In step 314, the content being provided can terminate after the first portion of the content has completed. In an aspect, the authorization system 128 can end transmission of content that was preauthorized to transmit. The authorization system 128 can periodically receive requests to determine whether authorization to access the content has been revoked. The requests to determine whether authorization to access the content has been revoked can be sent by the device. Upon receiving the request, the authorization system 128 can determine that authorization to access the content has been revoked. The authorization system 128 can send a notification that authorization to access the content has been revoked in response to determining authorization has been revoked. The device can terminate access to the content upon receiving the notification that authorization has been revoked. In an aspect, the authorization system 128 can send a notification to the content server to end transmission of the content if processing the authorization request fails.

The payment processing system 127 can pre-authorize the request for content prior to processing the authorization request. The payment processing system 127 can send a request to the entitlement system 126 to grant an entitlement for the content prior to processing the authorization request. The entitlement system 126 can receive the request to grant entitlement for the content and grant the entitlement by sending the entitlement to the device. The device can begin accessing the content while the authorization request is queued to be processed. When the authorization request is to be processed, the payment processing system 127 can remove the authorization request from the queue and process the authorization request. If the authorization request processes and payment is completed, then the device can continue to access the content because the device already has the entitlement. If the authorization request does not process or the payment fails, then payment processing system 127 can send a request to the entitlement system 126 to revoke the entitlement. Upon receiving the request to revoke the entitlement, the entitlement system 126 can revoke or remove the entitlement for the device to have access to the content. In an aspect, without entitlement, the device can no longer have access to the content.

Figure 4:
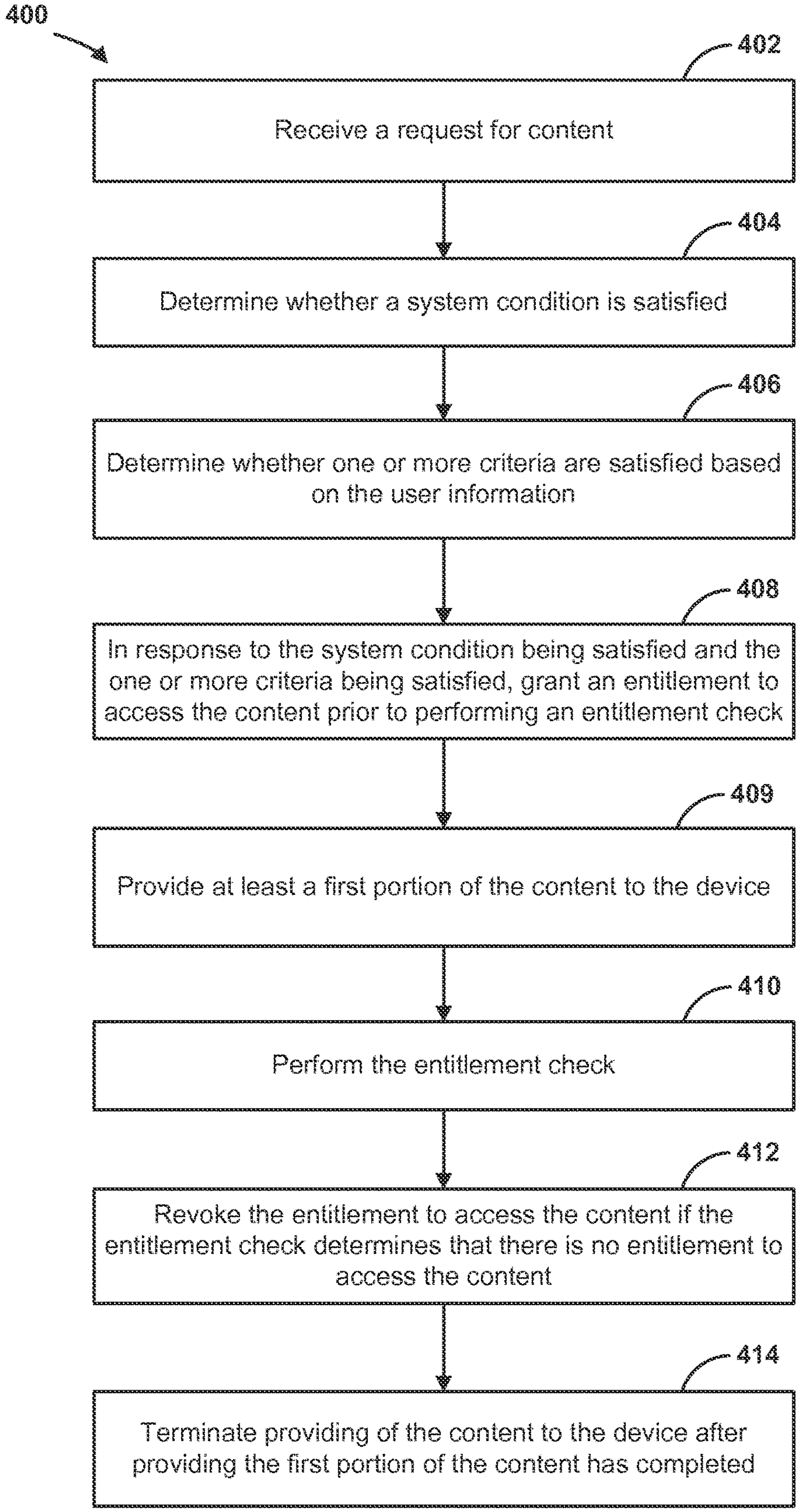
FIG. 4 is a flow chart of an exemplary method.

FIG. 4 illustrates a method 400 for pre-entitling content. In step 402, a request for content can be received. In an aspect, the request for content can be sent by a device (e.g., user device 124, CT 120, and/or the like). The request for content can be received by the authorization system 128 comprising an entitlement system 126. The content can require an entitlement check before being accessed by the device and/or user of the device. The request for content can comprise user information of a user of the device. Examples of user information can include, but are not limited to, a payment history, a credit score, a payment type, a type of request, content requested, a preferred user status, a geographic location of a user, combinations thereof, and the like. The request for content can comprise payment information such as a user account (e.g., account information as a subscriber or customer of a content provider) and/or other payment information (e.g., credit card information, bank account information). The content requested can comprise a content type. Content types can include, for example, one or more of, premium content (e.g., "pay channels" or otherwise encrypted content), video on demand assets (VOD), pay-per-view (PPV) events, pay-per-listen (PPL), audio on demand (A), combinations thereof, and the like.

In step 404, the authorization system 128 can determine whether a system condition is satisfied. The system condition can be a condition of the authorization system 128 and/or other devices on the system 100, the distribution system 116, the network 129, combinations thereof, and the like. The authorization system 128 can monitor for the system conditions and/or receive measurements from other devices and/or sensors on the system 100. For example, if a load of requests for content for a time period exceeds a threshold, then the authorization system 128 can switch from the check authorization first mode to the preauthorization mode to minimize delay for users accessing the content requested. As another example, there could be a large spike in traffic experienced by the entitlement system 126 in the time leading up to a live PPV event. The result of the large spike in traffic could delay the entitlement check, which will delay access to the live PPV event. Therefore, the authorization system 128 can determine that the rate at which the entitlement system 126 is performing entitlement checks is less than the rate at which the entitlement system 126 is receiving entitlement checks, then the authorization system 128 can switch to a preauthorization/pre-entitlement mode.

In step 406, the authorization system 128 can determine whether one or more criteria are satisfied based on the user information. The user information can indicate a likelihood that a user will or will not pass an entitlement check. The authorization system 128 can compare the user information to one or more criteria to determine the likelihood that a user will or will not pass the entitlement check and/or the processing of the authorization request. Based on the likelihood of passing or not passing, the authorization system 128 can determine an entitlement priority. The requests for content with the highest entitlement priority can have the least likelihood of passing the entitlement check and/or the processing of the authorization request. The requests most likely to pass the entitlement check can have the lowest entitlement priority.

The entitlement check can be queued in response to the system condition being satisfied. Based on the entitlement priority, the authorization system 128 can position the entitlement check in a queue. For example, a user with a delinquent user account can have a high entitlement priority. As another example, a user with a current user account can have a lower entitlement priority. In another example, a user with a preferred account can have a lowest entitlement priority. The authorization requests with the highest entitlement priority can be placed at the beginning of the queue. In another example, the authorization requests with the lowest entitlement priority can be placed at the end of the queue. In these examples, the payment processing system 127 can process the authorization requests of the most risky users first so that when the authorization system 128 is in a preauthorization mode, the users that are deemed risky will have payments processed first to minimize the amount of time preauthorized content is accessed by the risky users before the authorization system 128 determines to revoke the authorization.

The queue can be a priority queue that is dynamically updated based on the entitlement priority of a new request for content being received by the authorization system 128, an entitlement check being processed, an authorization request being processed, and the like. The queue can be implemented with a heap, an unordered array, a linked list, combinations thereof, and the like by a storage device. The queue can be a buffer implementing a first in first out (FIFO) algorithm for processing the authorization request and/or the entitlement check. The queue can be a stack implementing a last in first out (LIFO) algorithm for the entitlement check.

In step 408, in response to the system condition being satisfied and the one or more criteria being satisfied, the entitlement system 126 can grant the entitlement to the device to access the content prior to performing the entitlement check. In an aspect, when granting entitlement, the entitlement system 126 can send an entitlement message to a content server to transmit the content. In an aspect, an authorization message can be sent to a content server to transmit content. In an aspect, an entitlement such as a license, an encryption key, a password, an entitlement token, combinations thereof, and the like can be sent to the device to enable the device access to the content.

In step 409, at least a first portion of the content can be provided to the device. The content requested, or a portion thereof (e.g., a particular length of time or a number of frames, at a normal or altered bit rate), can be transmitted to the device. In step 410, the entitlement check can be performed at the entitlement system 126 after entitlement has been granted to the device to access the content. In an aspect, the entitlement check can fail such as due to system errors, the entitlement check determining that the device or the user of the device does not have entitlement to the content requested, combinations thereof, and the like.

In step 412, if the entitlement system 126 determines that the entitlement check failed, then the entitlement system 126 can revoke the entitlement to access the content by the device. The authorization system 128 and/or the entitlement system 126 can revoke the entitlement sent to the device. The entitlement system 126 can revoke a corresponding entitlement at the entitlement system 126.

In step 414, the content being provided to the device can terminate after the first portion of the content has completed. The entitlement system 126 can end transmission of content that was preauthorized to transmit by sending a termination message to the content server to end transmission of the content when the entitlement check results in a determination that there is no entitlement to access the content. The entitlement system 126 can periodically receive a request to determine whether the entitlement to access the content has been revoked. The request can be sent by the device. The entitlement system 126 can determine whether the entitlement to access the content has been revoked. In response to the entitlement being revoked, the entitlement system 126 can send a notification to the device that the entitlement to access the content has been revoked. The device can terminate access to the content upon receiving the notification that entitlement has been revoked. Other aspects are contemplated to revoke entitlement depending on the entitlement/authorization scheme implemented by the system.

Figure 5:
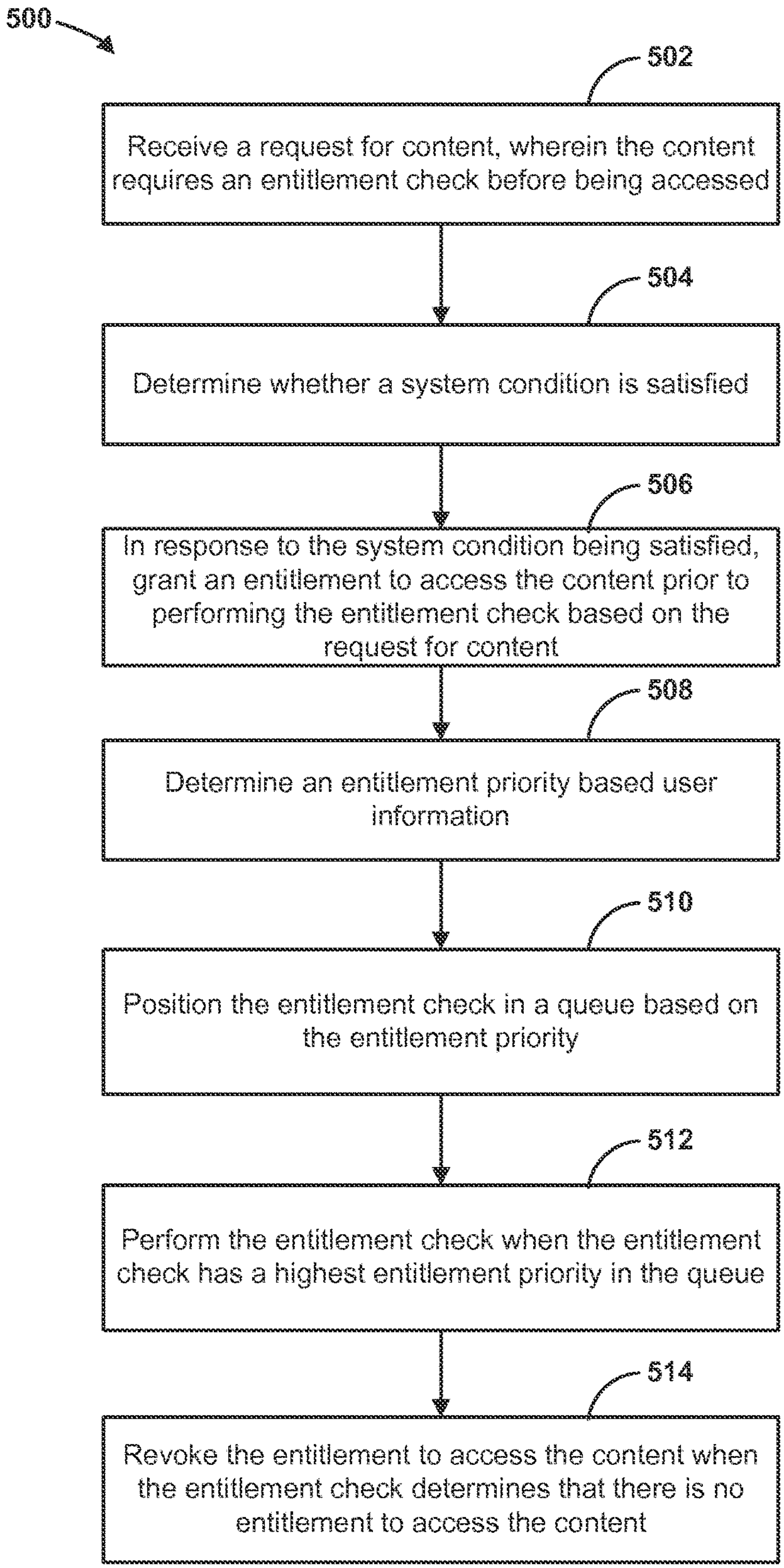
FIG. 5 is a flow chart of an exemplary method.

FIG. 5 illustrates a method 500 for pre-entitling content. In step 502, a request for content can be received. In an aspect, the request for content can be sent by a device (e.g., user device 124, CT 120, and/or the like). The request for content can be received by the authorization system 128 comprising an entitlement system 126. The content can require an entitlement check before being accessed by the device and/or user of the device. The request for content can comprise user information. Examples of user information can include, but are not limited to, a payment history, a credit score, a payment type, a type of request, content requested, a preferred user status, a geographic location of a user, combinations thereof, and the like. The request for content can comprise payment information such as a user account (e.g., account information as a subscriber or customer of a content provider) and/or other payment information (e.g., credit card information, bank account information). The content requested can comprise a content type. Content types can include, for example, one or more of, premium content (e.g., "pay channels" or otherwise encrypted content), video on demand assets (VOD), pay-per-view (PPV) events, pay-per-listen (PPL), audio on demand (A), combinations thereof, and the like.

In step 504, the authorization system 128 can determine whether a system condition is satisfied. The system condition can include, but is not limited to, a predetermined bandwidth, a throughput, a latency, a load, an error rate, combinations thereof, and the like. The system condition can be a condition of the authorization system 128 and/or other devices on the system 100, the distribution system 116, the network 129, combinations thereof, and the like. The authorization system 128 can monitor for the system conditions and/or receive measurements from other devices and/or sensors on the system 100. As an example, the system condition can be a threshold number of entitlement checks during a time period. For example, if a load of requests for content for a time period exceeds a threshold, then the authorization system 128 can switch from the check authorization first mode to the preauthorization mode minimize delay in accessing the content requested. As another example, there could be a large spike in traffic experienced by the entitlement system 126 in the time leading up to a live PPV event. The result of the large spike in traffic could delay entitlement checks, which will delay access to the live PPV event. Therefore, the authorization system 128 can determine that the rate at which the entitlement system 126 is performing entitlement checks is less than the rate at which the entitlement system 126 is receiving entitlement checks, then the authorization system 128 can switch to a preauthorization/pre-entitlement mode.

In step 506, in response to the system condition being satisfied, an entitlement to access the content prior to performing an entitlement check based on the request for content can be granted. In an aspect, when granting the entitlement, the entitlement system 126 can send an entitlement message to a content server to transmit the content. In an aspect, an authorization message can be sent to a content server to transmit content. The entitlement, such as a license, an encryption key, a password, an entitlement token, combinations thereof, and the like, can be sent to the device to enable the device to access the content.

In step 508, the authorization system 128 can determine an entitlement priority based on user information. The authorization system 128 can determine whether one or more criteria are satisfied based on the user information. The user information can indicate a likelihood that a user will or will not pass the entitlement check. The authorization system 128 can compare the user information to one or more criteria to determine the likelihood that a user will or will not pass the entitlement check and/or the processing of the authorization request. Based on the likelihood of passing or not passing, the authorization system 128 can determine the entitlement priority. The requests for content with the highest entitlement priority can have the least likelihood of passing the entitlement check and/or the processing of the authorization request. The requests most likely to pass the entitlement check and/or the processing of the authorization request can have the lowest entitlement priority.

In step 510, the authorization system 128 can position the entitlement check in a queue based on the entitlement priority. For example, a user with a delinquent user account can have a high entitlement priority. As another example, a user with a current user account can have a lower entitlement priority. In another example, a user with a preferred account can have a lowest entitlement priority. The entitlement checks with the highest entitlement priority can be placed at the beginning of the queue. In another example, the entitlement checks with the lowest entitlement priority can be placed at the end of the queue.

The queue can be a priority queue that is dynamically updated based on the entitlement priority of a new request for content being received by the authorization system 128, an entitlement check being processed, an authorization request being processed, and the like. The queue can be implemented with a heap, an unordered array, a linked list, combinations thereof, and the like by a storage device. The queue can be a buffer implementing a first in first out (FIFO) algorithm for processing the entitlement check. The queue can be a stack implementing a last in first out (LIFO) algorithm for processing the entitlement check.

In step 512, the authorization system 128 can perform the entitlement check when the entitlement check has a highest entitlement priority in the queue. In an aspect, during preauthorization mode, the entitlement check can be performed at the entitlement system 126 after the authorization system 128 has pre-authorized the device to use the content requested. For example, the entitlement system 126 can process the entitlement checks of the most risky users first so that when the authorization system 128 is in a preauthorization mode, then the users that are deemed risky will have an entitlement check performed first to minimize the amount of time pre-entitled content is accessed by the risky users before the entitlement system 126 revokes the entitlement.

The entitlement check can fail such as due to system errors, the entitlement check determining that the device or the user of the device does not have entitlement to the content requested, combinations thereof, and the like. If the entitlement system 126 determines that the entitlement check failed, then the entitlement system 126 can revoke the entitlement to access the content by the device in step 514. The authorization system 128 and/or the entitlement system 126 can revoke the entitlement sent to the device. The entitlement system 126 can revoke a corresponding entitlement at the entitlement system 126. The entitlement system 126 can end transmission of content that was preauthorized to transmit by sending a termination message to the content server to end transmission of the content when the entitlement check results in a determination that there is no entitlement to access the content. The entitlement system 126 can periodically receive a request to determine whether the entitlement to access the content has been revoked. The request can be sent by the device. The entitlement system 126 can determine whether the entitlement to access the content has been revoked. In response to the entitlement being revoked, the entitlement system 126 can send a notification to the device that the entitlement to access the content has been revoked. The device can terminate access to the content upon receiving the notification that the entitlement has been revoked. Other aspects are contemplated to revoke entitlement depending on the entitlement/authorization scheme implemented by the system.

Figure 6:
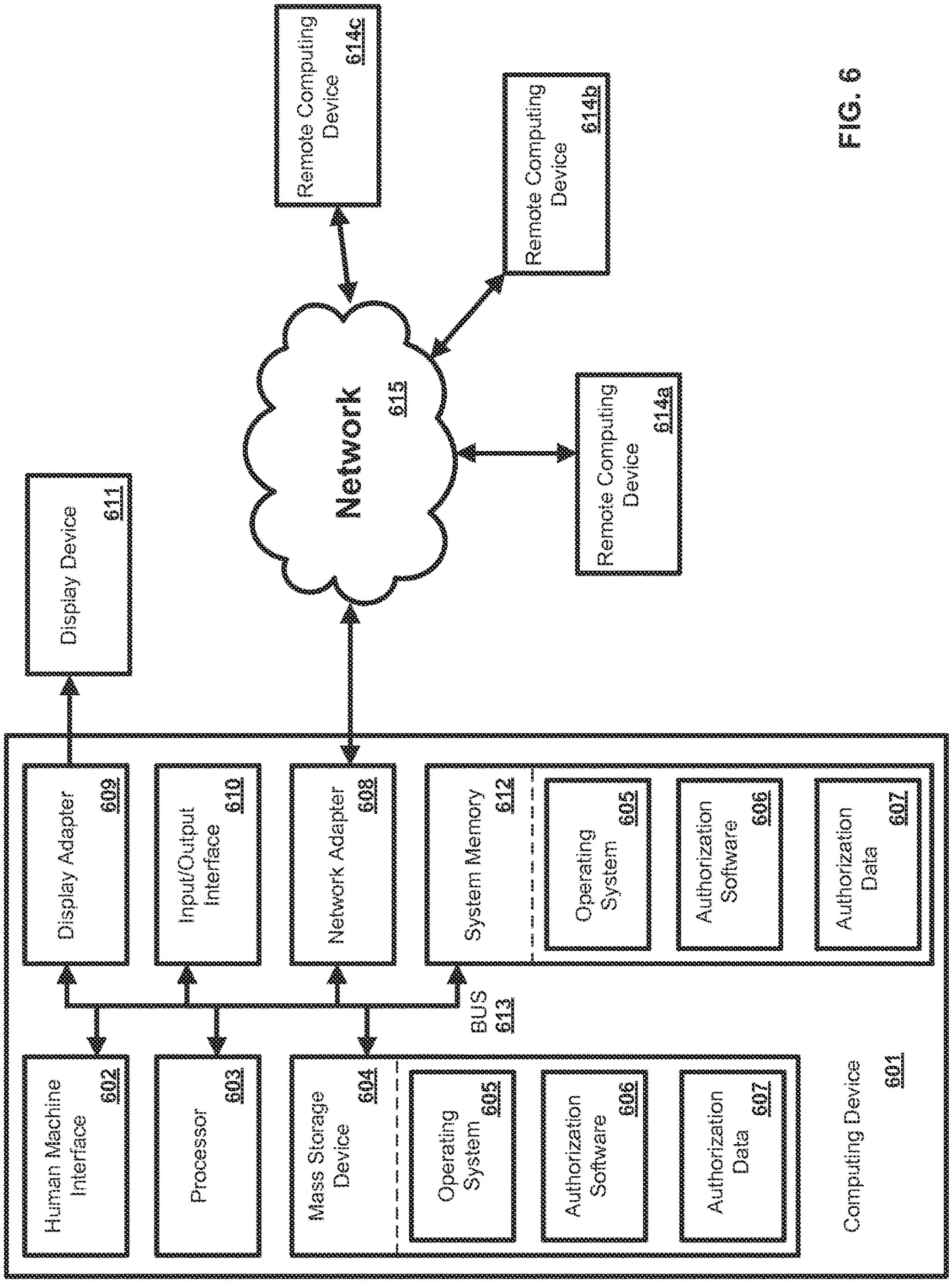
FIG. 6 is a block diagram of an exemplary computing device.

In an exemplary aspect, the methods and systems can be implemented on a computing system such as computing device 601 as illustrated in FIG. 6 and described below. By way of example, authorization system 128 of FIG. 2 can be a computing device as illustrated in FIG. 6. Similarly, the methods and systems disclosed can utilize one or more computers to perform one or more functions in one or more locations. FIG. 6 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computing device 601. The components of the computing device 601 can comprise, but are not limited to, one or more processors or processing units 603, a system memory 612, and a system bus 613 that couples various system components including the processing unit 603 to the system memory 612. In the case of multiple processing units 603, the system can utilize parallel computing.

The system bus 613 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 613, and all buses specified in this description can also be implemented over a wired or wireless network connection and each of the subsystems, including the processing unit 603, a mass storage device 604, an operating system 605, authorization software 606, authorization data 607, a network adapter 608, system memory 612, an Input/Output Interface 610, a display adapter 609, a display device 611, and a human machine interface 602, can be contained within one or more remote computing devices 614*a,b,c* at physically separate locations, connected through buses of this form, in effect implementing a fully distributed system.

The computing device 601 typically comprises a variety of computer readable media. Exemplary readable media can be any available media that is accessible by the computing device 601 and comprises, for example and not meant to be limiting, both volatile and non-volatile media, removable and non-removable media. The system memory 612 comprises computer readable media in the form of volatile memory, such as random access memory (RAM), and/or non-volatile memory, such as read only memory (ROM). The system memory 612 typically contains data, such as authorization data 607, and/or program modules, such as operating system 605 and authorization software 606 that are immediately accessible to and/or are presently operated on by the processing unit 603.

In another aspect, the computing 601 can also comprise other removable/non-removable, volatile/non-volatile computer storage media. By way of example, FIG. 6 illustrates a mass storage device 604 which can provide non-volatile storage of computer code, computer readable instructions, data structures, program modules, and other data for the computing device 601. For example and not meant to be limiting, a mass storage device 604 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 604, including by way of example, an operating system 605 and authorization software 606. Each of the operating system 605 and authorization software 606 (or some combination thereof) can comprise elements of the programming and the authorization software 606. Authorization data 607 can also be stored on the mass storage device 604. Authorization data 607 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computing device 601 via an input device (not shown). Examples of such input devices comprise, but are not limited to, a keyboard, pointing device (e.g., a "mouse"), a microphone, a joystick, a scanner, visual systems, such as Microsoft's Kinect, audio systems that process sound such as music or speech, a traditional silver remote control, tactile input devices such as gloves, touch-responsive screen, body coverings, and the like These and other input devices can be connected to the processing unit 603 via a human machine interface 602 that is coupled to the system bus 613, but can be connected by other interface and bus structures, such as a parallel port, game port, an IEEE 1394 Port (also known as a Firewire port), a serial port, or a universal serial bus (USB).

In yet another aspect, a display device 611 can also be connected to the system bus 613 via an interface, such as a display adapter 609. It is contemplated that the computing device 601 can have more than one display adapter 609 and the computing device 601 can have more than one display device 611. For example, a display device can be a monitor, an LCD (Liquid Crystal Display), or a projector. In addition to the display device 611, other output peripheral devices can comprise components such as speakers (not shown) and a printer (not shown) which can be connected to the computing device 601 via Input/Output Interface 610. Any step and/or result of the methods can be output in any form to an output device. Such output can be any form of visual representation, including, but not limited to, textual, graphical, animation, audio, tactile, and the like. The display device 611 and computing device 601 can be part of one device, or separate devices.

The computing device 601 can operate in a networked environment using logical connections to one or more remote computing devices 614*a,b,c*. By way of example, a remote computing device can be a personal computer, portable computer, a smartphone, a server, a router, a network computer, a peer device or other common network node, and so on. Logical connections between the computing device 601 and a remote computing device 614*a,b,c* can be made via a network 615, such as a local area network (LAN) and a general wide area network (WAN). Such network connections can be through a network adapter 608. A network adapter 608 can be implemented in both wired and wireless environments. Such networking environments are conventional and commonplace in dwellings, offices, enterprise-wide computer networks, intranets, and the Internet.

For purposes of illustration, application programs and other executable program components such as the operating system 605 are illustrated herein as discrete blocks, although it is recognized that such programs and components reside at various times in different storage components of the computing device 601, and are executed by the data processor(s) of the computer. An implementation of authorization software 606 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information, such as computer readable instructions, data structures, program modules, or other data. Exemplary computer storage media comprises, but is not limited to, RAM, ROM, EEPROM, flash memory or other memory technology. CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g., genetic algorithms), swarm intelligence (e.g., ant algorithms), and hybrid intelligent systems (e.g., expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:

receiving, by a computing device, a request for content, wherein the request is associated with a user device and is one of a plurality of requests for the content;

determining, based on the plurality of requests for the content, that the request associated with the user device is to be processed according to a pre-authorization mode of operation;

based on the request associated with the user device being processed according to the pre-authorization mode of operation, sending at least a portion of the content to the user device prior to processing, based on user information, an authorization request associated with accessing the content, wherein the user information is associated with the request and the user device;

determining, based on the user information, a processing priority for the authorization request;

determining a position in a queue of authorization requests based on the processing priority;

processing the authorization request based on the position in the queue of authorization requests; and ending, based on a failure of the authorization request, transmission of the content to the user device.

2. The method of claim 1, wherein determining that the request associated with the user device is to be processed according to the pre-authorization mode of operation comprises:

receiving, during a period of time, a first quantity of the plurality of requests for the content; and determining, based on the first quantity and the period of time, that the request associated with the user device is to be processed according to the pre-authorization mode of operation.

3. The method of claim 1, wherein the request associated with the user device comprises an identifier, and wherein the method further comprises:

determining, based on the identifier, the user information;
determining, based on the user information, a likelihood of passing or failing the authorization request; and
determining, based on the likelihood of passing or failing the authorization request, the processing priority of the authorization request.

4. The method of claim 1, further comprising:
receiving periodic requests to determine whether an authorization to access the content has been revoked;
determining, based on at least one of the periodic requests, that the authorization to access the content is revoked, and
sending, based on the determination that the authorization to access the content is revoked, a notification that the authorization is revoked.

5. The method of claim 1, wherein sending at least the portion of the content to the user device comprises sending an authorization message to a content server, wherein the content server sends, based on the authorization message, at least the portion of the content to the user device.

6. The method of claim 1, wherein sending at least the portion of the content to the user device comprises granting, by an entitlement system, an entitlement for the content prior to the authorization request being processed.

7. The method of claim 6, further comprising: removing, by the entitlement system, based on the failure of the authorization request, the entitlement for the content.

8. The method of claim 1, wherein the user information comprises an indication of a subscription to a premium level of service.

9. A method comprising:
receiving, by a computing device, a request for content associated with a device, wherein access to the content by the device requires an entitlement check, and wherein the request is one of a plurality of requests for the content;
determining, based on the plurality of requests for the content, that the entitlement check is to be processed according to a pre-authorization mode of operation;
determining, based on processing the entitlement check according to the pre-authorization mode of operation, that user information associated with the device satisfies one or more criteria;
determining, based on the one or more criteria being satisfied, that the device is temporarily entitled to access the content prior to processing the entitlement check;
sending, based on the device being temporarily entitled to access the content, at least a portion of the content to the device;
determining, based on the user information, an entitlement priority for the entitlement check;
determining a position in a queue of entitlement checks based on the entitlement priority;
processing the entitlement check based on the position in the queue of entitlement checks; and
ending, based on a failure of the entitlement check for the device, transmission of the content to the device.

10. The method of claim 9, further comprising:
determining, based on the user information associated with the device, a likelihood of the entitlement check passing or failing, wherein the entitlement priority is based on the likelihood of the entitlement check passing or failing.

11. The method of claim 10, wherein the position is indicative of the likelihood of the entitlement check passing or failing.

12. The method of claim 9, further comprising:
receiving a plurality of periodic requests to determine whether the device is still temporarily entitled to access the content;
determining, based on at least one of the plurality of periodic requests, that the device is no longer temporarily entitled to access the content; and
sending, based on the device no longer being temporarily entitled to access the content, a notification indicating that access to the content is revoked.

13. The method of claim 9, wherein sending at least the portion of the content to the device prior to processing the entitlement check comprises sending an entitlement message to a content server, wherein the content server sends, based on the entitlement message, at least the portion of the content to the device.

14. The method of claim 9, wherein determining that the user information associated with the device satisfies the one or more criteria comprises:
receiving, during a period of time, a first quantity of the plurality of requests for the content;
determining, based on the first quantity and the period of time, that a system condition is satisfied; and
determining, based on the system condition being satisfied, that the one or more criteria are satisfied.

15. A method comprising:
receiving a request for content associated with a device, wherein access to the content by the device requires an entitlement check, and wherein the request is one of a plurality of requests for the content;
determining, based on the plurality of requests for the content, that the entitlement check is to be processed according to a pre-authorization mode of operation;
sending, based on the pre-authorization mode of operation, at least a portion of the content to the device prior to processing the entitlement check;
determining, based on user information associated with the device, an entitlement priority for the entitlement check, wherein the request is indicative of the user information;
determining, based on the entitlement priority, a position for the entitlement check in a queue of entitlement checks;
processing the entitlement check based on the position in the queue of entitlement checks; and
ending, based on a failure of the entitlement check for the device, transmission of the content to the device.

16. The method of claim 15, further comprising:
sending, prior to processing the entitlement check, based on a temporary entitlement to access the content, at least the portion of the content to the device;
receiving a plurality of periodic requests to determine whether the temporary entitlement to access the content has been revoked;
determining, based on at least one of the plurality of periodic requests, that the temporary entitlement to access the content is revoked; and
sending, based on the temporary entitlement to access the content being revoked, a notification indicating that the temporary entitlement to access the content is revoked.

17. The method of claim 15, wherein determining that the entitlement check is to be processed according to the pre-authorization mode of operation comprises:
receiving, during a period of time, a first quantity of the plurality of requests for the content; and determining, based on the first quantity and the period of time, that the entitlement check is to be processed according to the pre-authorization mode of operation.

18. The method of claim 15, wherein sending at least the portion of the content to the device prior to processing the entitlement check comprises sending an entitlement message to a content server, wherein the content server sends, based on the entitlement message, at least the portion of the content.

19. The method of claim 15, wherein ending the transmission of the content to the device comprises sending a termination message to a content server, wherein the content server ends, based on the termination message, the transmission of the content to the device.

20. The method of claim 15, wherein the entitlement check comprises an authorization request for the content.

* * * * *